United States Patent [19]

Szlaga, Jr.

[11] Patent Number: 4,477,345

[45] Date of Patent: Oct. 16, 1984

[54] FILTER SEPARATOR WITH HEATER

[75] Inventor: Emil Szlaga, Jr., Connersville, Ind.

[73] Assignee: Stant Inc., Connersville, Ind.

[21] Appl. No.: 457,010

[22] Filed: Jan. 10, 1983

[51] Int. Cl.³ .................... B01N 27/10; B01D 35/18
[52] U.S. Cl. ..................................... 210/130; 210/184
[58] Field of Search ............. 210/114, 116, 131, 132, 210/130, 175, 184, 185, DIG. 17

[56] References Cited

U.S. PATENT DOCUMENTS

| | | | |
|---|---|---|---|
| 3,083,833 | 4/1963 | Kasten | 210/184 |
| 3,187,895 | 6/1965 | Pall et al. | 210/114 |
| 4,059,520 | 11/1977 | Roller | 210/184 |
| 4,091,265 | 5/1978 | Richards et al. | 210/184 X |
| 4,264,442 | 4/1981 | Jackson | 210/114 |
| 4,372,260 | 2/1983 | Baker | 210/184 X |
| 4,372,847 | 2/1983 | Lewis | 210/114 X |
| 4,428,351 | 1/1984 | Davis | 123/557 |

Primary Examiner—John Adee
Attorney, Agent, or Firm—Barnes & Thornburg

[57] ABSTRACT

A fuel-processing assembly for a fuel system has a housing, a fuel-entry port and a fuel-exit port, and a passageway within the housing through which fuel can flow from the entry port to the exit port. A heater is provided for heating the fuel. A spring is coiled around the heater to cause the fuel to flow spirally around the heater to induce turbulence into the flow of fuel and promote contact between fuel and the heater. A separator is provided for separating fuel from water entrained in the fuel. A by-pass aperture adjacent the separator allows fuel to flow around the separator if the flow of fuel through the separator becomes impeded.

12 Claims, 3 Drawing Figures

FILTER SEPARATOR WITH HEATER

This invention relates to liquid fossil fuel-powered engines, and more particularly to fuel-processing assemblies for such engines.

Liquid fossil fuels, such as gasoline and diesel fuel, often contain impurities which adversely affect the engine performance. Among the impurities are particulate matter and water. Diesel fuel tends to contain more particulants and water than gasoline and hence is more likely to need filtering and separating before injecting it into an engine. Particulants in a fuel system can often clog fuel lines and fuel injectors, and cause deposits to be formed in the combustion chamber. When water-laden diesel fuel is run through a fuel system and engine, the presence of water often will cause the fuel injection system to malfunction. The injectors do not properly dispense fuel into the combustion chambers. Further, when water-laden fuel is burned, the imperfect combustion of the fuel caused by the water will often cause an engine to run rough, and in some cases to stall.

In cold weather, fuel can become more viscous and flow through the fuel system more slowly. Diesel fuel has a higher freezing point than gasoline, and thus is more likely to freeze or become too viscous to flow through the fuel system. The problem of fuel-line freezing is aggravated by the presence of water which can form ice crystals in the fuel system and block the flow of fuel through the system. Diesel fuel normally contains a higher water content than gasoline. As such, owners of diesel engines are more likely to experience fuel line freeze than owners of gasoline-powered engines.

Fuel-processing assemblies such as fuel filters and separators often employ media to separate particulates and water from the fuel. In many of these fuel processing assemblies, the fuel is passed through the media. In cold weather, the fuel may jell in these media, impeding the flow of fuel through the media. This may result in fuel being unable to reach the combustion chamber, thus starving the engine and preventing the engine from running.

In accordance with the instant invention, a fuel processing assembly is provided for placement in the fuel system which includes a housing and a fuel passageway in the housing. A means for inducing turbulence is provided in the passageway to promote contact between the fuel and the heater.

The use of a heater and a turbulence-inducing means has the advantage of providing an efficient mechanism for heating the fuel. Heating the fuel promotes its free flow through the fuel-processing assembly. The fuel heated by the heater will not only flow more freely through the portion of the fuel passageway adjacent to the heater, but the heated fuel will also transfer heat to fuel in the fuel-processing assembly or fuel system downstream of the heater. This has the beneficial effect of thawing out any fuel or water which is impeding the flow of fuel through the fuel system. For example, if fuel is jelled in a media, the presence of heated fuel will tend to thaw the jelled fuel, thus enabling fuel to begin flowing through the media again.

A preferred embodiment of the instant invention includes a by-pass means to by-pass a clogged element or elements in the fuel-processing assembly. Preferably, the by-pass means is designed to enable the fuel to flow around the clogged element. This enables the fuel to reach the engine notwithstanding the presence of a clogged element.

In one embodiment of the instant invention, a fuel-processing assembly has a heater for heating the fuel, a filter for filtering the fuel, and a separating means for separating fuel from water entrained in the fuel. This embodiment has the advantage of combining a heater, filter, and separator in one fuel-processing assembly. The presence of these three elements helps to alleviate the problems discussed above.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
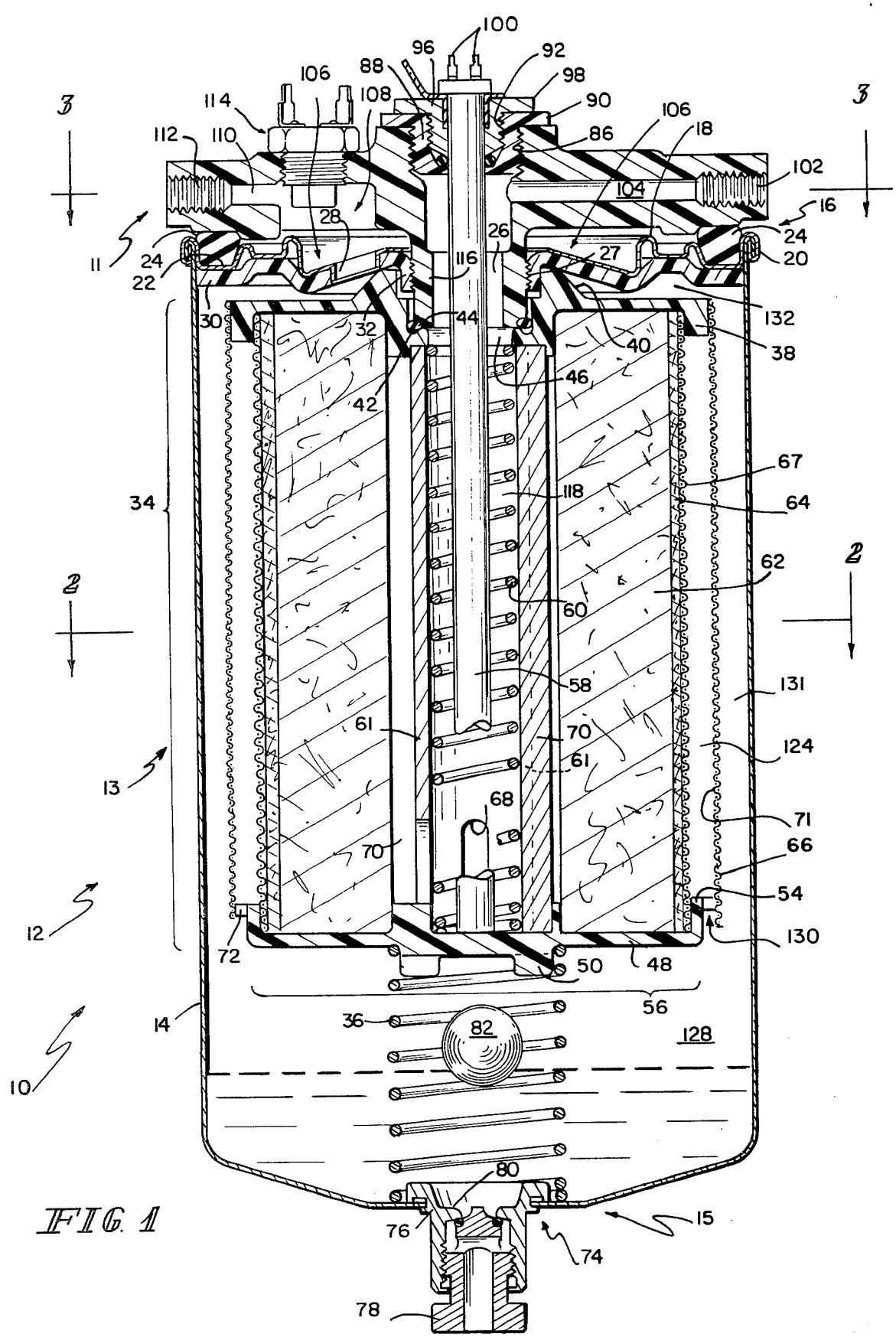
FIG. 1 is a cross-sectional view partly broken away of the fuel-processing assembly embodying the present invention.
Figure 2:
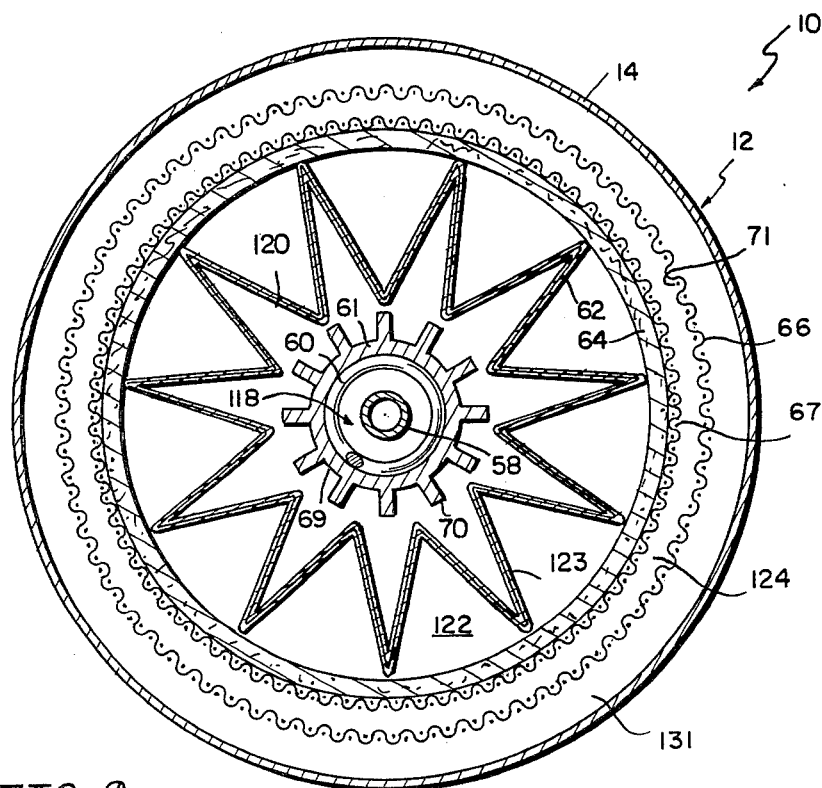
FIG. 2 is a transverse view of the fuel-processing assembly taken generally along lines 2—2 of FIG. 1.
Figure 3:
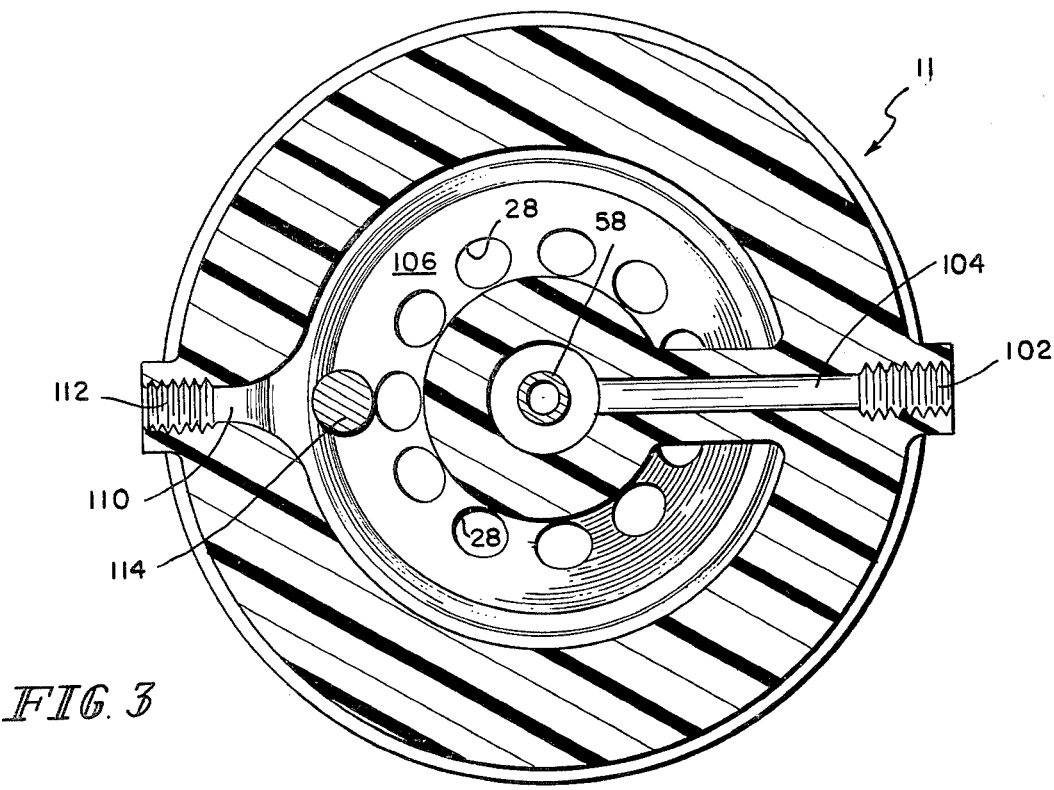
FIG. 3 is a transverse view of the fuel-processing assembly taken generally along lines 3—3 of FIG. 1.

Referring to the figures, a fuel-processing assembly 10 has a connector portion 11 and a replaceable portion 12. Connector portion 11 includes a means (not shown) such as a mounting bracket to stationarily attach the connector portion 11 to the vehicle, such as the engine or the fire wall. Replaceable portion 12 is selectively attachable to connector portion 11. Replaceable portion 12 includes a cylindrical housing 13 which is constructed of sheet metal, plastic, or the like. Cylindrical housing 13 includes a side wall 14, a bottom portion 15, and top portion 16. Top portion 16 includes a top plate 18 which is joined to side wall 14 by roll seam 20. A peripheral groove 22 is formed in top plate 18. Gasket 24 is placed in peripheral groove 22 to form a seal between the replaceable portion 12 and the connector portion 11. A central entry port 26 having threads 27 is provided near the center of top plate 18 to provide a means through which fuel can enter the housing 13. A plurality of exit ports 28 encircle central entry port 26 and provide a means through which fuel can leave the housing 13. A mounting plate 30 is disposed flush under top plate 18 to provide support for top plate 18. Mounting plate 30 includes a threaded, downwardly turned circular flange 32 which defines the walls of entry port 26.

A cartridge assembly 34 is disposed inside the housing 13 and urged upwardly in the housing 13 by expansion-biased spring 36. Expansion-biased spring 36 extends from the inside of bottom portion 15 of housing 13 to the bottom of cartridge assembly 34. Cartridge assembly 34 includes a molded upper end cap 38. Upper end cap 38 includes a molded circular upper flange 40 which encircles the down-turned flange 32 of the mounting plate 30. The placement of the upper flange 40 around the down-turned flange 32 laterally positions the cartridge assembly 34 in the housing 13, and prevents the cartridge assembly 34 from moving laterally within the housing 13. Upper end cap 38 further includes a circular lip 42 which serves as a seat for O-ring 44. A central aperture 46 of upper end cap 38 is aligned with entry port 26 to define a portion of the passageway through which fuel can flow in the housing 13.

Lower support member 48 of cartridge assembly 34 includes a molded lower circular lip 50 around which is positioned one end of expansion spring 36. An upwardly disposed peripheral flange 54 is formed around the outside of lower support member 48.

Cartridge assembly 34 includes a series 56 of coaxially disposed elements including a heating means such as heater 58, a turbulence-inducing means such as spring 60, a tubular member 61, a filter means such as filter 62, and a separating means. The separating means includes two separating elements, coalescer 64 and screen 66. A wire mesh 67 is disposed around the outside of coalescer 64. Heater 58, turbulence-inducing means 60, and tubular member 61 are preferably constructed of a heat-conductive material such as aluminum or steel to enhance their abilities to transfer heat to the fuel. Tubular member 61 includes four slots 68 at its lower portion which enable fuel to flow from inside the tubular member 61 to the outside of the tubular member 61. Axially disposed on the outer surface 69 of tubular member 61 are a series of metal fins 70 which serve as heat sinks to convectionally transfer heat to the fuel which contacts the fins 70. The filter 62 is preferably pleated, and is comprised of paper treated to resist tearing and shredding caused by the water and fuel passing therethrough.

Coalescer 64 is preferably comprised of a fiberglass media which acts to help separate fuel from water entrained in the fuel by causing the water to coalesce in droplets and thereby effect a physical separation of the water and the fuel. Screen 66 is preferably a silicon-treated nylon screen having 50 micron pores therein. The axially disposed screen 66 serves as a separating media, allowing fuel to pass through the screen 66. Water entrained in the fuel collects on the inner surface 71 of the screen 66 and falls downwardly rather than passing through screen 66. Several bridge members 72 are disposed radially on the upwardly disposed peripheral flange 54 to maintain the spacing of the screen 66 between the coalescer 64 and side wall 14.

Bottom portion 15 of housing 13 includes a drain means 74 for draining water from the housing 13. The drain means 74 includes a drain housing 76 which is preferably staked to the bottom portion 15 of housing 13 to provide a leak-proof seal. Drain stem 78 provides a valve for controlling the flow of liquid out of the cylindrical housing 13. Drain housing 76 includes a seat 80 upon which ball 82 can rest. Ball 82 is preferably comprised of a plastic material and has a density greater than fuel oil but less than water. Ball 82 floats in the more dense water but sinks in the less dense fuel. When liquid is drained through drain means 74, the ball 82 seats on seat 80 before any fuel in the housing 13 can escape through drain means 74.

Connector portion 11 is preferably constructed of a molded plastic or metal and includes a threaded central aperture 86. An insulator 88 is threadably engaged to aperture 86. Insulator 88 includes a hexagonal head 90 which enables one to securely thread the insulator 88 to central aperture 86. Alternatively, a pair of winged grips (not shown) can be used in lieu of the hexagonal head 90. Insulator 88 is preferably composed of a non-heat-conductive material to thermally insulate the heater 58 from the rest of the connector portion 11. Insulator 88 includes a threaded central aperture 92. A threaded plug 96 is threaded into the aperture 92 and encircles the probe-like heater 58. Plug 96 also includes either a hexagonal head 98 or wing grip (not shown) to facilitate the placement of plug 96 into the central aperture 92 and to facilitate the removal of the plug 96 therefrom. Wires 100 connect heater 58 to the vehicle's electrical system to provide a source of electricity for resistively heating heater 58.

An entry port 102 is threaded to enable one to thread a fuel line to connector portion 11 to enable fuel to flow into entry tube 104 and ultimately into the housing 13 of replaceable portion 12. Circular fuel exit passageway 106 is disposed above the plurality of exit ports 28 of the replaceable portion 12. Fuel exit passageway 106 includes a widened portion 108 which connects to exit tube 110. Exit tube 110 terminates in a connector portion exit port 112 which is threaded to threadably engage a fuel line (not shown). Thermostat 114 is partially disposed in widened portion 108, and threadably engages a threaded aperture 115 in the connector portion 11. Connector portion 11 also includes an axially disposed central threaded tubular stud 116 which engages threads 27 of entry port 26 of the replaceable portion 12 to engage the replaceable portion 12 to the connector portion 11.

In operation, fuel flows from a fuel line (not shown) into the connector portion entry port 102 and into entry tube 104. From entry tube 104, fuel flows into entry port 26 of replaceable portion 12, and enters the fuel passageway in the housing 13. The fuel flows in the entry port 26 around heater 58 and moves downwardly into first space 118 which is defined by heater 58, the inner surface of tubular member 61, and turbulence-inducing means 60. The fuel flows spirally downward in first space 118, generally following a path between the coils of the spring 60. The heater 58, spring 60, and tubular members 61 are all constructed of heat-conductive material so that heater 58 heats spring 60 and tubular member 61. This spiral flow induces turbulence in the fuel to promote contact between the fuel and the heat-conductive heater 58 to more efficiently heat the fuel which flows in first space 118.

When the fuel reaches the lower portion of first space 118, it flows radially outwardly through slots 68 into second space 120. The second space 120 is defined by the outer surface 69 of tubular member 61, the metal fins 70 disposed on the outer surface 69 of tubular member 61, and the filter means 62. The fuel flows upwardly in second space 120 along the axially disposed fins 70, and radially outwardly through filter 62. Fins 70 are in a heat-transfer relationship with tubular member 61, spring 60, and heater 58. Thus, fins 70 are heated by heater 58. Fuel which contacts fins 70 becomes heated by the fins 70.

Fuel flows radially outwardly through paper filter 62 and into a third space 122. Third space 122 is comprised of a plurality of pie-shaped spaces defined by the coalescer 64 and the outer surface 123 of filter element 62. The filter element 62 serves to filter particulant matter contained in the fuel, resulting in substantially particulant-free fuel flowing into third space 122.

Fuel flows radially outwardly from third space 122 through coaelescer 64 into a fourth space 124. Coalescer 64 helps separate fuel from water entrained in the fuel. As the fuel passes through coalescer 64, the water entrained in the fuel coalesces into droplets. These droplets pass through coalescer 64, and flow downward in fourth space 124, through circular slot 130 into water-collection space 128, which is disposed generally below cartridge assembly 34 and fourth space 124.

Fuel in the fourth space 124 flows radially outwardly through screen 66. Screen 66 further separates fuel from water entrained in the fuel, generally allowing only fuel to pass radially outwardly therethrough. Water which collects on the inner surface 71 of screen 66 will flow downward in fourth space 124 and through circular slot 130 down into water-collection space 128. Fuel in an outer peripheral space 131 flows upwardly into exit space 132.

When the flow of fuel through screen 66 is impeded, such as by fuel being jelled on screen 66, circular slot 130 serves as a by-pass means for by-passing the impeded screen 66. If the flow of fuel through screen 66 is impeded, fuel will flow downward in fourth space 124, through slot 130, around screen 66, and upward into peripheral space 131. Water is relatively more dense than fuel. Thus, water entrained in the fuel which flows through circular slot 130 will tend to move downward into water-collection space 128 rather than upward into the peripheral space 131.

Screen 66 is relatively rigid to maintain its axial conformation under the pressure exerted by the flowing fuel. If screen 66 is too flexible, and is allowed to stretch outwardly into peripheral space 131, the flow of fuel in peripheral space 131 can become impeded, possibly blocking the flow of fuel to the engine.

Fuel in exit space 132 flows upward through replaceable portion exit port 28 and into the circular fuel exit passageway 106. Fuel in circular fuel exit passageway 106 flows toward the widened portion 108 of the exit passageway 106 and travels upward past thermostat 114 into exit tube 110. Fuel flows outward from exit tube 110 into exit port 112 and into a portion of the fuel line (not shown).

Thermostat 114 monitors the temperature of the fuel flowing through widened space 108 and is in communication with the heater 58. When fuel flowing past thermostat 114 is below a preselected temperature, the thermostat 114 will, through a control means (not shown), cause the heater 58 to be turned on to begin heating the fuel. When the thermostat 114 senses that the fuel is above a certain preselected temperature, the thermostat 114 will, through a control means (not shown), cause the heater 58 to be turned off.

Water which collects in water-collection space 128 can be drained by unscrewing the drain stem 78 of drain means 74. Plastic ball 82, being more dense than oil but less dense than water, will tend to float at the water-oil interface in the water-collection space 128 (should both fuel and water be present in water-collection space 128). As water is drained from the drain stem 78, the level of water in the water-collection space 128 will decrease. This causes the ball 82 to sink downwardly with the level of water in the space 128. When the water is almost fully drained from the water-collection space 128, the level of ball 82 is low enough to enable the ball 82 to become seated upon seat 80. The ball 82 serves as a plug for drain means 74, retarding the further flow of fluid through the drain stem 78. This prevents fuel which is contained in the water-collection space 128 from draining through the drain stem 78. After removing the water from water-collection space 128, the drain stem 78 is turned, closing the drain means 74 and preventing the flow of liquid therethrough.

The replaceable portion 12 is attached to the connector portion 11 by the engagement of the threaded entry port 26 of the replaceable portion 12 with the threaded stud 116 of the connector portion. The replaceable portion 12 is rotated until a secure seal is established between gasket 24 and connector portion 11.

When removing the replaceable portion 12 from the connector portion 11, the replaceable portion 12 is rotated until threads 27 become disengaged from threaded stud 116. The replaceable portion 12 is moved downwardly to disengage heater 58 from the interior of spring 60. In certain applications, there may be insufficient space to permit the user to move the replaceable portion 12 downwardly far enough to enable him to disengage the interior of spring 60 from heater probe 58. In such cases, heater probe 58 can be removed upward by turning hexagonal head 98 to disengage the thread of the plug 96 from the threaded aperture 92 of insulator 88. The heater 58 can then be removed upward from its position in connector portion 11 and replaceable portion 12. This enables the user to remove replaceable portion 12 from connector portion 11 even in spaces wherein downward movement of the replaceable portion 12 is restricted.

Although the invention has been described in detail with references to certain preferred embodiments and specific examples, variations and modifications exist within the scope and spirit of the invention as described and as defined in the following claims.

What is claimed is:

1. A fuel-processing assembly comprising a housing having a fuel entry port and a fuel exit port, a series of elements disposed in the housing, the elements including a heater for heating the fuel, fuel passageway-defining means disposed coaxially with the heater to define a fuel passageway between the entry port and the exit port, the fuel passageway-defining means at least partially surrounding the heater, turbulence-inducing means for inducing turbulence in the fuel passageway to promot contact between the fuel and the heater, the turbulence-inducing means being disposed in the fuel passageway and at least partially surrounding the heater, and fuel-processing means for processing the fuel.

2. The invention of claim 1 wherein the turbulence-inducing means comprises a heat-conductive element coiled around the heater.

3. The invention of claim 1 wherein the turbulence-inducing means is in heat-transfer relationship with the fuel passageway-defining means, and the fuel passageway-defining means includes a tubular member having at least one opening to permit fuel to flow radially outward therefrom.

4. The invention of claim 3 further comprising means for transferring heat radially outward from the tubular member.

5. The invention of claim 4 wherein the means for transferring heat comprises a plurality of fins in heat-transfer relationship to the tubular member.

6. The invention of claim 1 wherein the fuel-processing means comprises a separating means disposed in the housing for separating fuel from water entrained in the fuel, the separating means including a separating element and means for by-passing the separating element if the flow of fuel through the separating element becomes impeded.

7. The invention of claim 1 wherein the heater comprises a generally elongated member selectively detachable from said housing.

8. The invention of claim 6 wherein the fuel-processing means further includes a filter means for filtering the fuel, the filter means being disposed coaxially with the heater between the separating element and the heater, and at least partially surrounding the heater.

9. The invention of claim 8 wherein the fuel passageway-defining means further includes a support member disposed transversely to the separating element and underlying the filter means, at least one bridge member extending radially outward from the support member for maintaining the separating element and support member in a fixed spaced relationship, and means providing an aperture in the bridge member to permit fuel to by-pass the separating element if the flow of fuel through the separating element becomes impeded.

10. A fuel-processing assembly comprising
   a housing having a fuel entry port and a fuel exit port,
   a series of elements disposed in the housing, the elements including
      a heater for heating the fuel,
      a tubular member disposed coaxially with the heater to define a fuel passageway in the housing, the tubular member at least partially surrounding the heater,
      a turbulence-inducing means coiled around the heater between the heater and the tubular member for inducing turbulence in the passageway to promote contact between the fuel and heater, and
      a separating means for separating fuel from water entrained in the fuel, the separating means including a separating element and means for by-passing the element if the flow of fuel through the passageway becomes impeded.

11. The invention of claim 10 wherein the separating element comprises a porous screen means disposed coaxially with the heater, and the fuel flows radially outward through the separating element.

12. The invention of claim 10 wherein the means for by-passing the element comprises an aperture in the passageway adjacent the separating element to permit fuel to flow past the separating element.

* * * * *